United States Patent
Shieh et al.

(10) Patent No.: US 9,329,765 B2
(45) Date of Patent: May 3, 2016

(54) METHOD AND ELECTRONIC APPARATUS FOR SCROLLING FRAME CONTENT AND RECORDING MEDIUM USING THE SAME

(71) Applicant: HTC Corporation, Taoyuan County (TW)

(72) Inventors: Chia-Chia Shieh, Taoyuan County (TW); Yen-Shun Wu, Taoyuan County (TW); Ting-An Yang, Taoyuan County (TW); Ju-Wei Huang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 221 days.

(21) Appl. No.: 14/019,552

(22) Filed: Sep. 6, 2013

(65) Prior Publication Data

US 2014/0372937 A1 Dec. 18, 2014

Related U.S. Application Data

(60) Provisional application No. 61/834,881, filed on Jun. 14, 2013.

(51) Int. Cl.
*G06F 3/0485* (2013.01)
*G06F 3/0486* (2013.01)
*G06F 3/0484* (2013.01)
*G06F 3/0481* (2013.01)

(52) U.S. Cl.
CPC ............ *G06F 3/0486* (2013.01); *G06F 3/0481* (2013.01); *G06F 3/0485* (2013.01); *G06F 3/04817* (2013.01); *G06F 3/04847* (2013.01); *G06F 2203/04803* (2013.01)

(58) Field of Classification Search
CPC ...................................................... G06F 3/0485
USPC .......................................................... 715/784
See application file for complete search history.

(56) References Cited

U.S. PATENT DOCUMENTS

| | | | |
|---|---|---|---|
| 5,739,821 A * | 4/1998 | Ho et al. ....................... | 715/807 |
| 6,353,442 B1 * | 3/2002 | Masui ........................... | 345/684 |
| 7,340,689 B2 * | 3/2008 | Berstis ......................... | 715/801 |
| 7,966,578 B2 | 6/2011 | Tolmasky et al. | |
| 8,902,248 B1 * | 12/2014 | Bidarkar et al. .............. | 345/619 |
| 2005/0177798 A1 * | 8/2005 | Thomson et al. ............. | 715/788 |
| 2007/0143690 A1 * | 6/2007 | Nakajima et al. ............. | 715/750 |
| 2008/0168405 A1 * | 7/2008 | Tolmasky et al. ............. | 715/863 |
| 2008/0178115 A1 * | 7/2008 | Yokota ......................... | 715/784 |
| 2009/0293007 A1 * | 11/2009 | Duarte et al. ................. | 715/767 |
| 2010/0199180 A1 * | 8/2010 | Brichter ....................... | 715/702 |
| 2011/0145757 A1 * | 6/2011 | Janwari ......................... | 715/786 |
| 2012/0240079 A1 * | 9/2012 | Takami ......................... | 715/784 |
| 2012/0284663 A1 * | 11/2012 | Driver et al. .................. | 715/784 |

(Continued)

*Primary Examiner* — Reza Nabi
*Assistant Examiner* — Daniel Rodriguez
(74) *Attorney, Agent, or Firm* — Jianq Chyun IP Office

(57) ABSTRACT

A method and an electronic apparatus for scrolling frame content and a recording medium using the same, adapted to an electronic apparatus having a touch screen, are provided. In the method, a page including at least one content scrollable frame is displayed on the touch screen. Next, a scrolling operation performed on a content scrollable frame of the at least one content scrollable frame on the touch screen is detected. Then, whether the content scrollable frame is entirely shown or partially shown on the touch screen is determined. Finally, the content in the content scrollable frame or the page and the content scrollable frame are scrolled according to the scrolling operation based on the determination.

16 Claims, 8 Drawing Sheets

(56) References Cited

U.S. PATENT DOCUMENTS

| | | | |
|---|---|---|---|
| 2012/0290971 A1* | 11/2012 | Takami | 715/784 |
| 2013/0326398 A1* | 12/2013 | Zuverink et al. | 715/784 |
| 2014/0136960 A1* | 5/2014 | Borza et al. | 715/247 |
| 2014/0143727 A1* | 5/2014 | Krikke et al. | 715/835 |
| 2014/0189558 A1* | 7/2014 | Takami | 715/767 |
| 2015/0070399 A1* | 3/2015 | Kosecoff | 345/684 |
| 2015/0324079 A1* | 11/2015 | Kashima et al. | 715/784 |

* cited by examiner

# METHOD AND ELECTRONIC APPARATUS FOR SCROLLING FRAME CONTENT AND RECORDING MEDIUM USING THE SAME

CROSS-REFERENCE TO RELATED APPLICATION

This application claims the priority benefits of U.S. provisional application Ser. No. 61/834,881, filed on Jun. 14, 2013. The entirety of the above-mentioned patent applications is hereby incorporated by reference herein and made a part of this specification.

BACKGROUND

To fit today's busy life, different space-efficient and highly portable mobile devices are developed. Taking personal digital assistants (PDA), PDA phones, and smart phones as examples, they not only offer various functions as conventional communication devices do, but also allow the users to edit files, send/receive e-mails, browse web pages, and perform instant messaging through built-in operating system (OS).

As to a light, slim, and small portable electronic device, the volume thereof has to be very small, and the screen size thereof has to be reduced. To dispose a larger screen within a limited space, a touch screen has been developed recently, in which the screen is simultaneously served as a display unit and an input unit of a portable electronic apparatus, so that both the cost and the space for disposing a conventional keyboard are saved. The operation of the touch screen is very simple and straightforward. A user can perform various operations on the screen by simply touching the screen with a stylus or a finger.

Recently, a frame-based page including multiple frames for accommodating various application icons or widgets, such as tiles in Windows 7 mobile, is developed to help users to efficiently organize their desktop. However, those frames together share the display area of the touch screen, and the information that can be shown on each frame is very limited. Therefore, how to allow a user to see more information within the frames without affecting his/her regular operations on the frame-based page is an object to be accomplished in the industry.

SUMMARY OF THE APPLICATION

Accordingly, the present application is directed to a method and an electronic apparatus for scrolling frame content, through which a user is allowed to scroll the content of a frame in a page or scroll the whole page through a scrolling operation.

The present application provides a method for scrolling frame content, adapted to an electronic apparatus having a touch screen. In the method, a page comprising at least one content scrollable frame is displayed on the touch screen. Next, a scrolling operation performed on a content scrollable frame of the at least one content scrollable frame on the touch screen is detected. Then, whether the content scrollable frame is entirely shown or partially shown on the touch screen is determined. Finally, the content in the content scrollable frame or the page and the content scrollable frame are scrolled according to the scrolling operation based on the determination.

The present application provides an electronic apparatus for scrolling frame content including a touch screen, a storage unit, and one or more processing units. The storage unit stores a plurality of modules. The processing units are coupled to the touch screen and the storage unit. The processing units execute the modules recorded in the storage unit to cause the electronic apparatus to display a page comprising at least one content scrollable frame on the touch screen, to detect a scrolling operation performed on a content scrollable frame of the at least one content scrollable frame to determine whether the content scrollable frame is entirely shown or partially shown on the touch screen, and to scroll the content in the content scrollable frame or scrolling the page and the content scrollable frame according to the scrolling operation based on the determination.

The present application provides a recording medium which stores a computer program. The computer program is loaded into an electronic apparatus to execute following steps. A page comprising at least one content scrollable frame is displayed on a touch screen of the electronic apparatus. Next, a scrolling operation performed on a content scrollable frame of the at least one content scrollable frame on the touch screen is detected. Then, whether the content scrollable frame is entirely shown or partially shown on the touch screen is determined. Finally, the content in the content scrollable frame or the page and the content scrollable frame are scrolled according to the scrolling operation based on the determination.

As described above, the method and the electronic apparatus for scrolling frame content and a recording medium using the same of the present application determines a scrolling operation of a user to be functioned on a page or on a content scrollable frame in the page according to conditions of whether the content scrollable frame is entirely shown on the touch screen and/or whether the page is static. Accordingly, the scrolling operation of the user can be ideally identified and a convenient way for operating the electronic apparatus is achieved.

These and other exemplary examples, features, aspects, and advantages of the application will be described and become more apparent from the detailed description of exemplary examples when read in conjunction with accompanying drawings.

BRIEF DESCRIPTION OF THE DRAWINGS

The accompanying drawings are included to provide a further understanding of the application, and are incorporated in and constitute a part of this specification. The drawings illustrate examples of the application and, together with the description, serve to explain the principles of the application.

DESCRIPTION OF THE EXAMPLES

Figure 1:
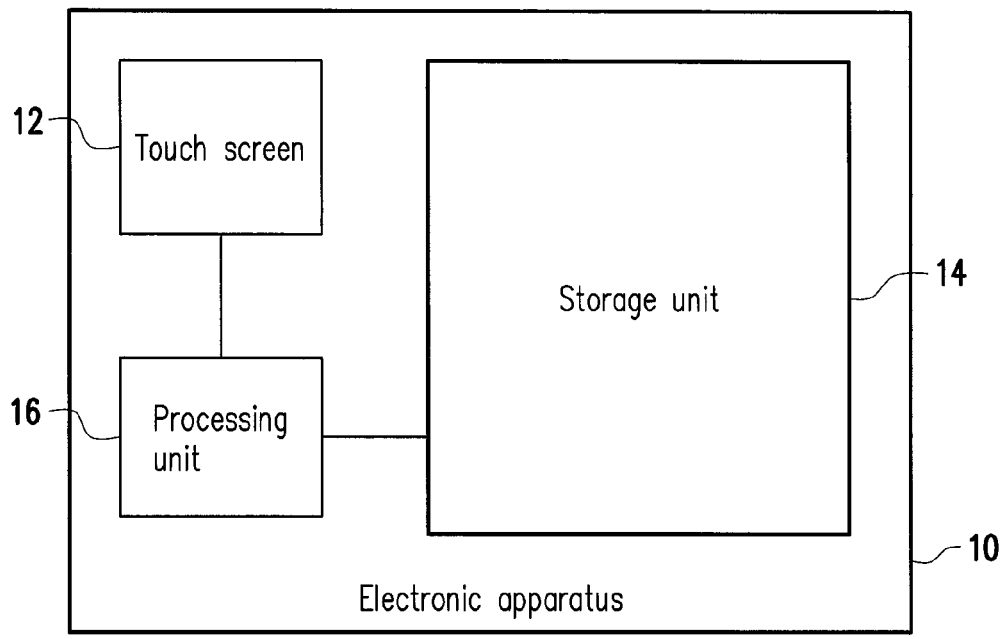
FIG. 1 is a block diagram of an electronic apparatus for scrolling frame content according to an example of the present application.

Reference will now be made in detail to the present preferred examples of the application, examples of which are illustrated in the accompanying drawings. Wherever possible, the same reference numbers are used in the drawings and the description to refer to the same or like parts.

In a frame-based page, multiple frames are sequentially arranged according to the screen size of the electronic apparatus, and the frames overflowing the display area of the screen may be placed in an extended portion of the page (regularly extended downward). A scrolling operation is provided for the users to scroll the page so as to find the desired frame. However, in order to allow the user to see more information of a content scrollable frame in the page, a scrolling operation is also required for the users to scroll the content of such frame. To distinguish the scrolling operation on the page from the scrolling operation on the content of the frame, at least one factor including the location of the scrolling operation, the appearance of the frame, and the movement of the page are taken into consideration, so as to facilitate user's operations on both the page and the frames.

FIG. 1 is a block diagram of an electronic apparatus for scrolling frame content according to an example of the present application. Referring to FIG. 1, the electronic apparatus 10 in the present example may be a cell phone, a smart phone, a personal digital assistant (PDA), a PDA phone, a laptop, or a tablet computer. The electronic apparatus 10 includes a touch screen 12, a storage unit 14, and a processing unit 16. Please note that the number of the processing unit is not limited to one in the present application.

The functions of aforementioned components are respectively explained below.

The touch screen 12 is fabricated by integrating resistive, capacitive, or any other type of touch sensing devices with a liquid crystal display (LCD), and which can detect the touch operations performed by a user at the same time when displaying frames of the electronic apparatus 10.

The storage unit 14 is one or a combination of a stationary or mobile random access memory (RAM), read-only memory (ROM), flash memory, hard disk, or any other similar device, and which records a plurality of modules that can be executed by the processing unit 16. These modules can be loaded into the processing unit 16 to execute a frame content scrolling function.

The processing unit 16 includes one or a combination of a central processing unit (CPU), a programmable general- or specific-purpose microprocessor, a digital signal processor (DSP), a programmable controller, application specific integrated circuits (ASIC), a programmable logic device (PLD), or any other similar device. The processing unit 16 is coupled to the touch screen 12 and the storage unit 14. The processing unit 16 accesses and executes the modules recorded in the storage unit 14 to perform a frame content scrolling function.

Aforementioned modules include, for example, a display module, a detection module, a determination module, and a scrolling module. These modules may be computer programs which can be loaded into the processing unit 16 to execute the frame content scrolling function. Further, although the modules are shown as separate components, the modules could also be implemented in a single component for efficiency or convenience. Below, how the electronic apparatus 10 scrolls the frame content is described in detail with reference to examples of the present application.

Figure 2:
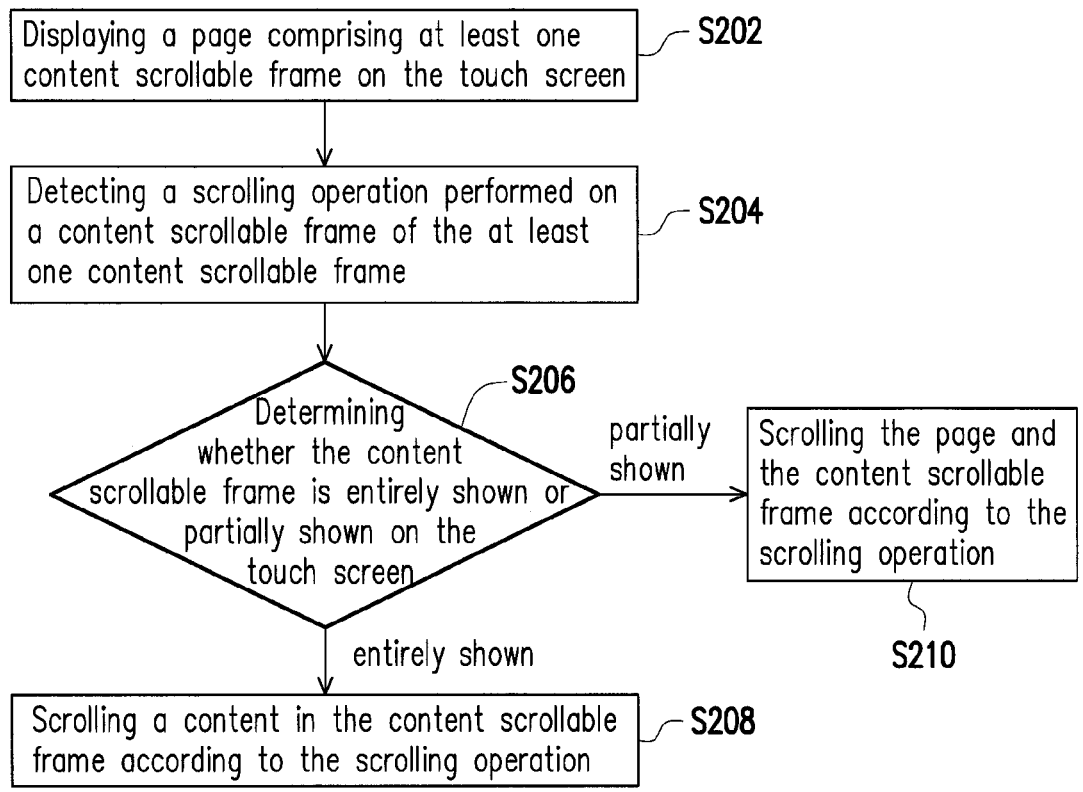
FIG. 2 is a flowchart of a frame content scrolling method according to an example of the present application.

FIG. 2 is a flowchart of a frame content scrolling method according to an example of the present application. Referring to FIG. 2, the method of the present example is suitable for the electronic apparatus 10 illustrated in FIG. 1. Below, the frame content scrolling method is described in detail with reference to various components of the electronic apparatus 10.

Figure 3:
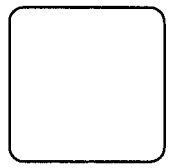
FIG. 3 is a schematic diagram illustrating available frame sizes in a page according to an example of the present application.
Figure 3:
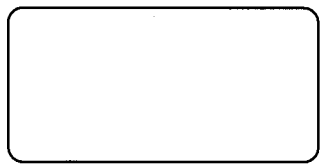
Figure 3:
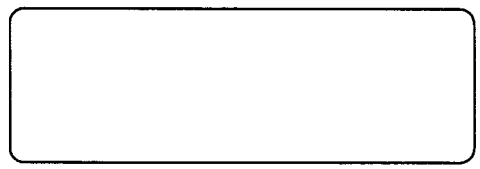
Figure 3:
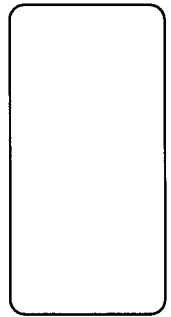
Figure 3:
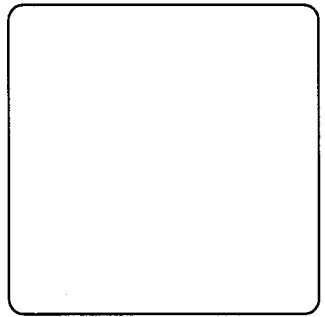
Figure 3:
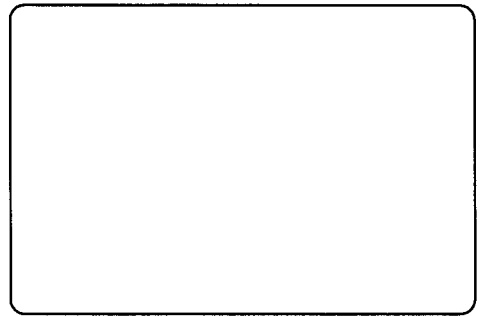
Figure 3:
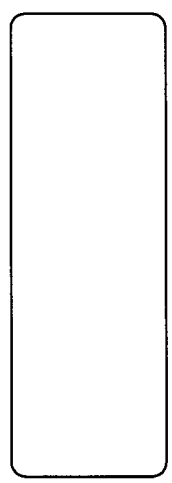
Figure 3:
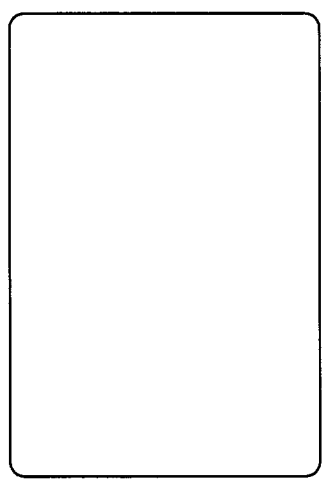
Figure 3:
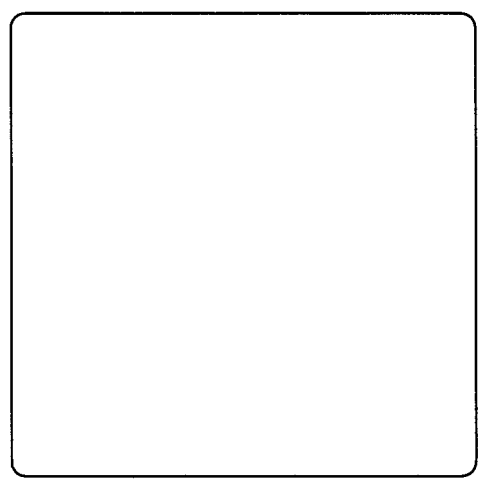

First, when the display module is executed by the processing unit 16, the electronic apparatus 10 displays a page comprising at least one content scrollable frame on the touch screen 12 (step S202), wherein, in one example, the aforesaid page is a page including at least one content scrollable frame such as the page of a website browser including a scrollable electronic map, and in another example, the page may be a frame-based page consisting of multiple frames, and the size of those frames comprises 1×1, 1×2, 1×3, 2×1, 2×2, 2×3, 3×1, 3×2, and 3×3 of a unit size (as shown in FIG. 3), but the present application is not limited thereto. The unit size may have a width of, for example, one-third width of the touch screen 12 and have a height of, for example, one-fourth height of the touch screen 12. When a new frame is added to the page, the size of the frame may be set as 1×1, 2×1, or 2×2 of the unit size and may be changed to anyone of aforesaid sizes through pressing and dragging a corner of the frame or dragging a resize button on the corner of the frame.

It is noted that the frames of the page may be classified into content scrollable frames and content unscrollable frames. The content scrollable frame may be a list having multiple items such as contact list, message list, email list, or event list and those items are able to be scrolled by a scrolling operation. The content unscrollable frame is, as its literal meaning, not scrollable and therefore if there is a scrolling operation performed on such frame, the whole page including all the frames in the page is scrolled according to the scrolling operation. In one example, all the frames in the page can be content scrollable frames. To ensure that the page is always scrollable, in one example, the frames in the page is arranged to make at least one content unscrollable frame be shown on the touch screen 12, and in another example, the frames in the page is arranged to make each row of the frames at least include one content unscrollable frame.

Then, when the detection module is executed by the processing unit 16, the electronic apparatus 10 detects a scrolling operation performed on a content scrollable frame of the at least one content scrollable frame on the touch screen 12 (step S204). It is noted that the scrolling operation may be performed on the content scrollable frame or content unscrollable frame. If the scrolling operation is performed on the content unscrollable frame, the page including all the frames is scrolled by the scrolling operation. If the scrolling operation is performed on the content scrollable frame, a further determination is executed to determine whether to scroll the content scrollable frame.

After the scrolling operation performed on the content scrollable frame is detected, when the determination module is executed by the processing unit 16, the electronic apparatus 10 determines whether the content scrollable frame is entirely shown or partially shown on the touch screen 12 (step S206). It is noted herein that the frames in the page of the present example may overflow a display area of the touch screen 12 such that the page may be extended downward to accommodate those overflowed frames and allow the users to scroll so as to find desired frames. When the page is, for example, scrolled upward, the frames in the extended portion of the page may appear from the bottom edge of the touch screen 12. During the moving or after the moving of the page, some of the frames may be entirely shown on the touch screen 12 while some of the frames may be partially shown on the touch screen 12. The present example assumes that the content scrollable frame that is entirely shown on the touch screen 12 may contain essential information that the user requires to determine whether to see further information and perform the scrolling operation. Accordingly, the present example allows the content in the entirely-shown content scrollable frame to be scrolled by the scrolling operation performed thereon and prohibits the content in the partially-shown content scrollable frame from being scrolled by the scrolling operation.

Based on the above, if the electronic apparatus 10 determines the content scrollable frame is entirely shown on the touch screen 12, the scrolling module is executed by the processing unit 16 to cause the electronic apparatus 10 to scroll a content in the content scrollable frame according to the scrolling operation without scrolling the page and the content scrollable frame (step S208); if the electronic apparatus 10 determines the content scrollable frame is partially shown on the touch screen 12, the scrolling module is executed by the processing unit 16 to cause the electronic apparatus 10 to scroll both the page and the content scrollable frame according to the scrolling operation without scrolling the content in the content scrollable frame (step S210).

Figure 4A:
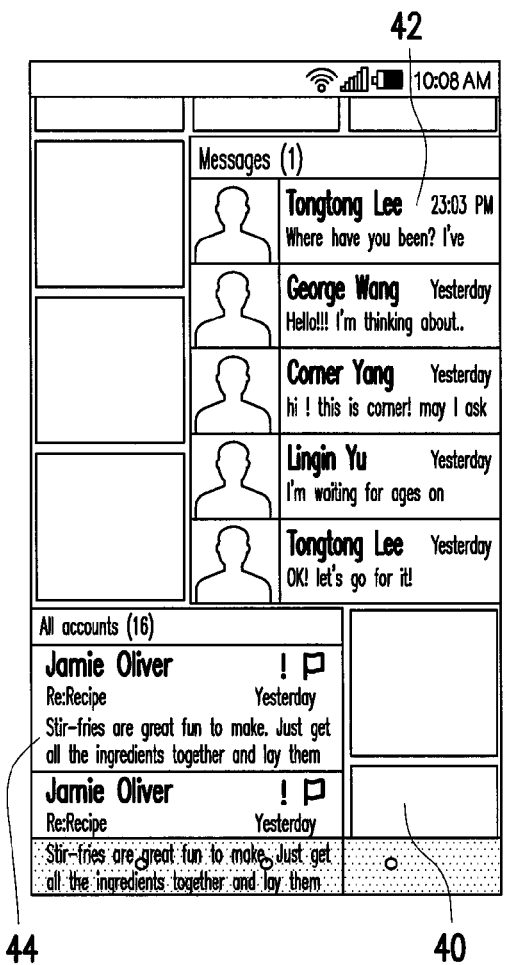
FIG. 4A to FIG. 4E are schematic diagrams illustrating a method for scrolling frame content according to an example of the present application.
Figure 4B:
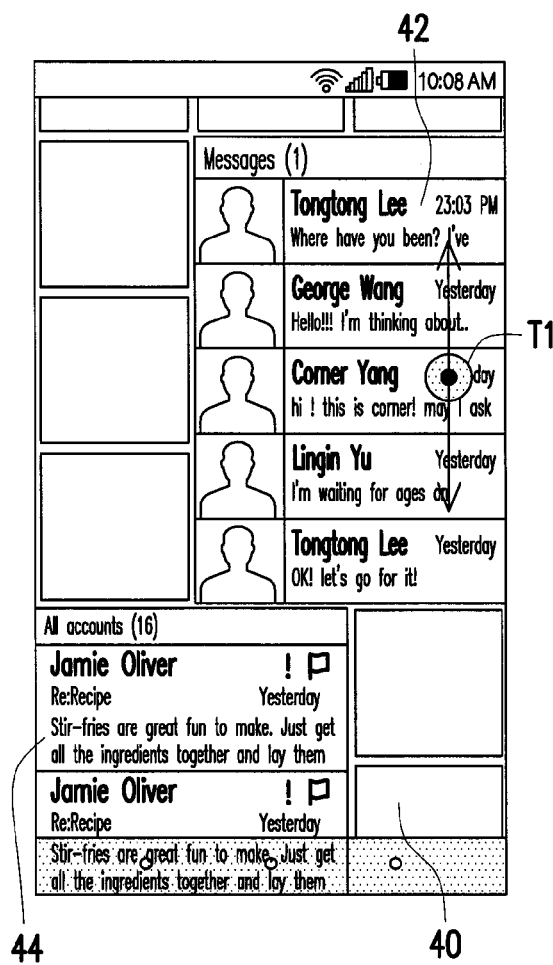
Figures 4C, 4D:
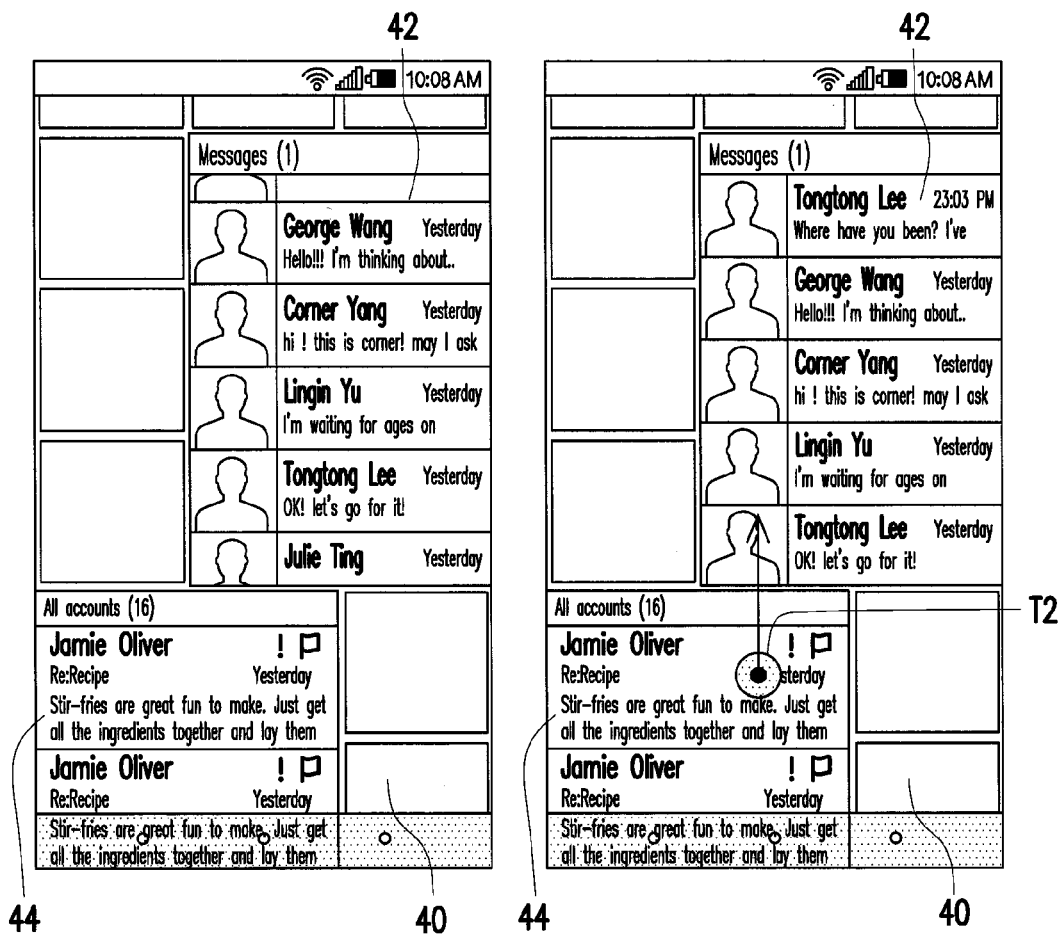
Figure 4E:
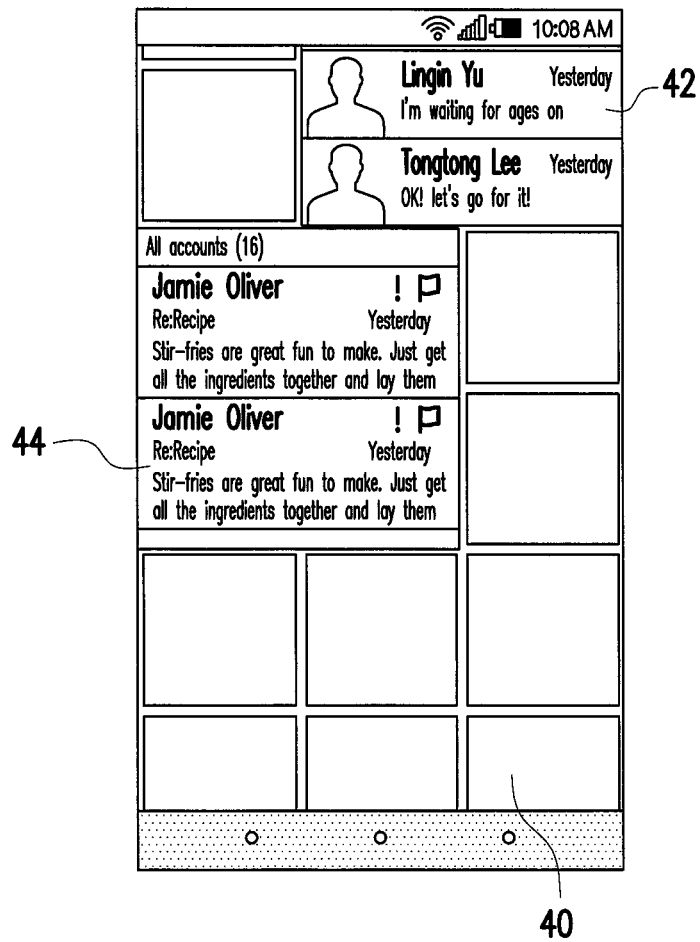

For example, FIG. 4A to FIG. 4E are schematic diagrams illustrating a method for scrolling frame content according to an example of the present application. Referring to FIG. 4A, a page 40 displayed on the touch screen comprises two content scrollable frames 42 and 44. In this example, one condition at which the frame can be scrolled is that the frame has to be entirely shown on the touch screen. Referring to FIG. 4B and FIG. 4C, since the frame 42 is entirely shown on the touch screen, when there is a scrolling operation T1 performed on the frame 42, only the content of the frame 42 is scrolled according to the scrolling operation T1 (as shown in FIG. 4C). On the other hand, referring to FIG. 4D and FIG. 4E, since the frame 44 is partially shown on the touch screen, when there is a scrolling operation T2 performed on the frame 44, the page 40 is scrolled according to the scrolling operation T1 and the frames 42 and 44 are also scrolled following the page 40, but the content in the frame 44 is not scrolled according to the scrolling operation T1. Through aforesaid method, the user may scroll the content in the content scrollable frame to find the desired information or scroll the whole page to find the desired frame through a simple scrolling operation and therefore a convenient and intuitive way for operating the electronic apparatus is achieved.

It is noted that another condition may be further added to determine whether to scroll the content of the content scrollable frame. This condition is the page has to be static when detecting a scrolling operation initially. In other words, when the page is moving (i.e., not static), even though the user performs a scrolling operation on the content scrollable frame, the content in the content scrollable frame will not be scrolled. Examples are given below for further illustration.

Figure 5:
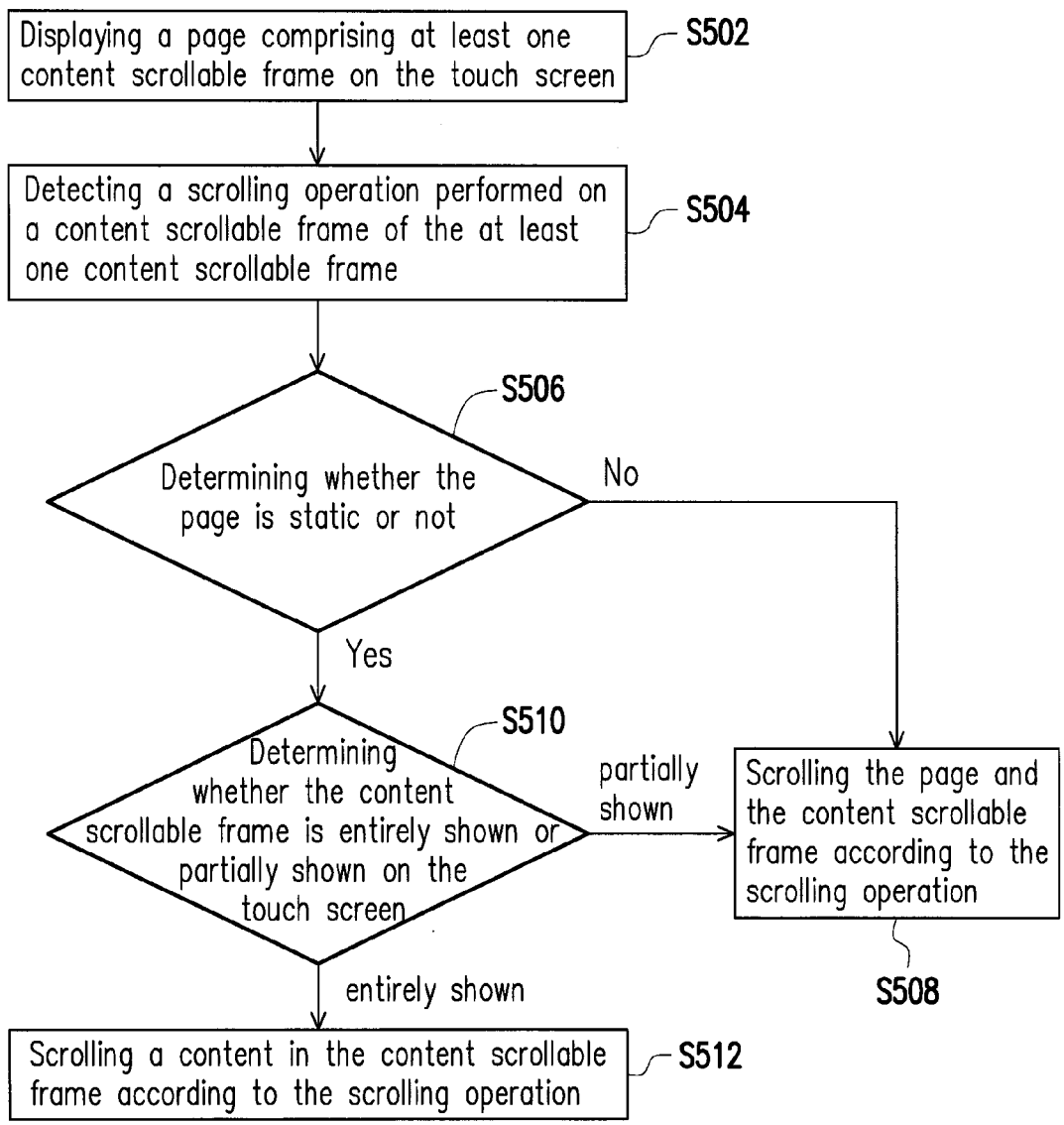
FIG. 5 is a flowchart of a frame content scrolling method according to an example of the present application.

FIG. 5 is a flowchart of a frame content scrolling method according to an example of the present application. Referring to FIG. 5, the method of the present example is suitable for the electronic apparatus 10 illustrated in FIG. 1. Below, the frame content scrolling method is described in detail with reference to various components of the electronic apparatus 10.

First, when the display module is executed by the processing unit 16, the electronic apparatus 10 displays a page comprising at least one content scrollable frame on the touch screen 12 (step S502), and when the detection module is executed by the processing unit 16, the electronic apparatus 10 detects a scrolling operation performed on a content scrollable frame of the at least one content scrollable frame on the touch screen 12 (step S504). Steps S502 and S504 are the same as or similar to steps S202 and S204 in the example described above and therefore the details thereof are not repeated herein.

The differences from the example described above lie in that, in the present example, after the scrolling operation performed on the content scrollable frame is detected, the determination module is executed by the processing unit 16 to cause the electronic apparatus 10 to determine whether the page is static or not (step S506). If the electronic apparatus 10 determines the page is not static, the scrolling module is executed by the processing unit 16 to cause the electronic apparatus 10 to directly scroll both the page and the content scrollable frame according to the scrolling operation without scrolling the content in the content scrollable frame (step S508).

However, if the electronic apparatus 10 determines the page is static, the determination module is further executed by the processing unit 16 to cause the electronic apparatus 10 to further determine whether the content scrollable frame is entirely shown or partially shown on the touch screen 12 (step S510). If the electronic apparatus 10 determines the content scrollable frame is entirely shown on the touch screen 12, the scrolling module is executed by the processing unit 16 to cause the electronic apparatus 10 to scroll a content in the content scrollable frame according to the scrolling operation without scrolling the page and the content scrollable frame (step S512); if the electronic apparatus 10 determines the content scrollable frame is partially shown on the touch screen 12, the scrolling module is executed by the processing unit 16 to cause the electronic apparatus 10 to scroll both the page and the content scrollable frame according to the scrolling operation without scrolling the content in the content scrollable frame (step S508). Steps S510, S512 and S508 are the same as or similar to steps S206 to S210 in the example described above and therefore the details thereof are not repeated herein.

Figure 6:
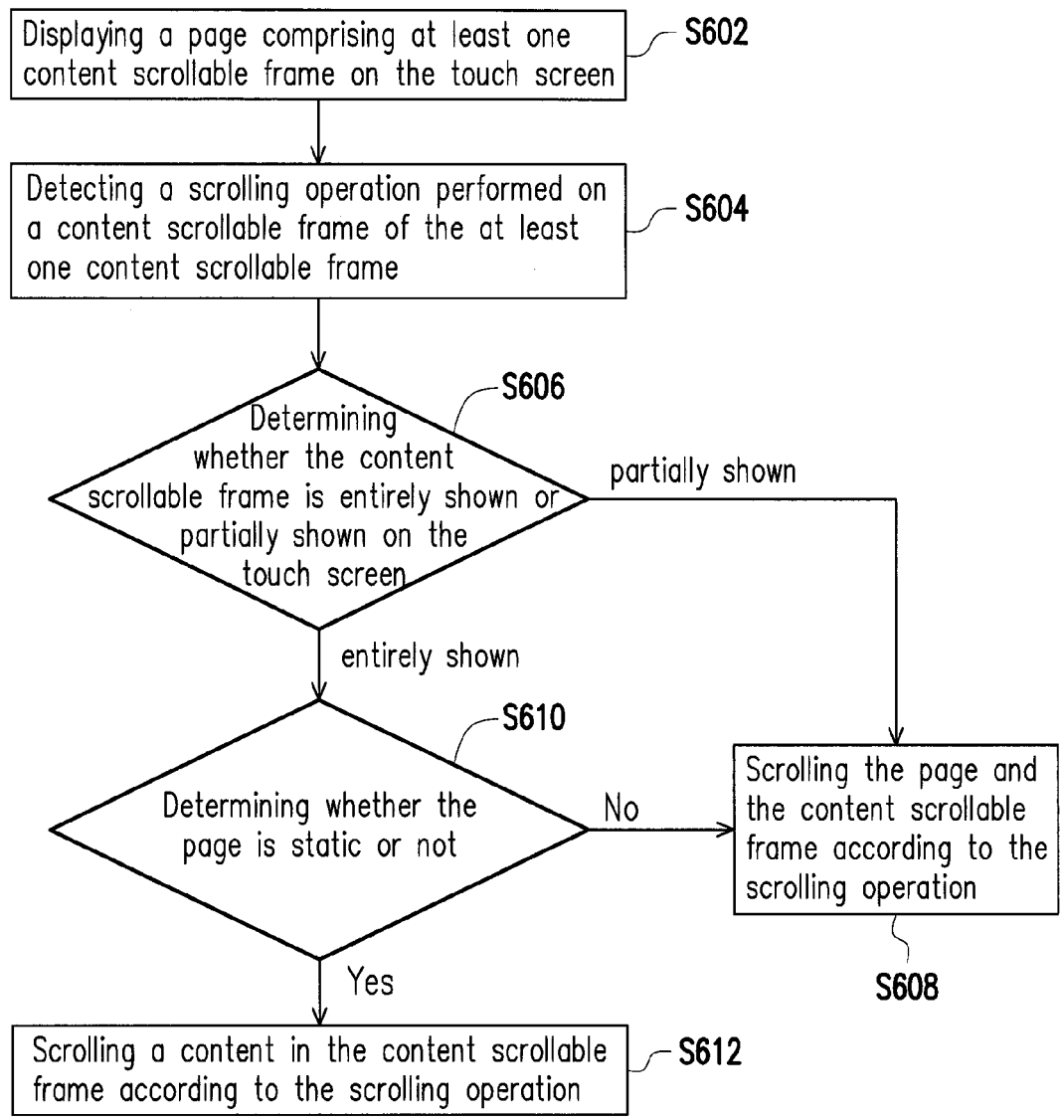
FIG. 6 is a flowchart of a frame content scrolling method according to an example of the present application.

FIG. 6 is a flowchart of a frame content scrolling method according to another example of the present application. Referring to FIG. 6, the method of the present example is suitable for the electronic apparatus 10 illustrated in FIG. 1. Below, the frame content scrolling method is described in detail with reference to various components of the electronic apparatus 10.

First, when the display module is executed by the processing unit 16, the electronic apparatus 10 displays a page comprising at least one content scrollable frame on the touch screen 12 (step S602). When the detection module is executed by the processing unit 16, the electronic apparatus 10 detects a scrolling operation performed on a content scrollable frame of the at least one content scrollable frame on the touch screen 12 (step S604). After the scrolling operation performed on the content scrollable frame is detected, the electronic apparatus 10 determines whether the content scrollable frame is entirely shown or partially shown on the touch screen 12 (step S606). If the electronic apparatus 10 determines the content scrollable frame is partially shown on the touch screen 12, the scrolling module is executed by the processing unit 16 to cause the electronic apparatus 10 to directly scroll both the page and the content scrollable frame according to the scrolling operation without scrolling the content in the content scrollable frame (step S608). Steps S602 to S608 are the same as or similar to steps S202 to S206 and S210 in the example described above and therefore the details thereof are not repeated herein.

The differences from the example described above lie in that, in the present example, if the electronic apparatus 10 determines the content scrollable frame is entirely shown on the touch screen 12, the determination module is further executed by the processing unit 16 to cause the electronic apparatus 10 to further determine whether the page is static or not (step S610). If the electronic apparatus 10 determines the page is static, the scrolling module is executed by the processing unit 16 to cause the electronic apparatus 10 to scroll a content in the content scrollable frame according to the scrolling operation without scrolling the page and the content scrollable frame (step S612); if the electronic apparatus 10 determines the page is not static, the scrolling module is executed by the processing unit 16 to cause the electronic apparatus 10 to scroll both the page and the content scrollable frame according to the scrolling operation without scrolling the content in the content scrollable frame (step S608).

Through aforesaid method, the user is allowed to scroll the whole frame instead of the content in the frame when the page is under moving (i.e. not static), and therefore the scrolling on the content in the content scrollable frame can be isolated from the scrolling on the page and malfunctions raised by user's unintentional operation can be avoided. It is noted that, beside the scrolling operation, a tap operation performed on an item of the content scrollable frame may cause the item being tapped to be launched when the page is static. Otherwise, when the page is under moving (i.e. not static), a tap operation performed on anywhere of the page (including the content scrollable frames and the content unscrollable frames) may cause an interruption of the scrolling on the page and therefore the page is stopped. An example is given below for further illustration.

Figures 7A, 7B:
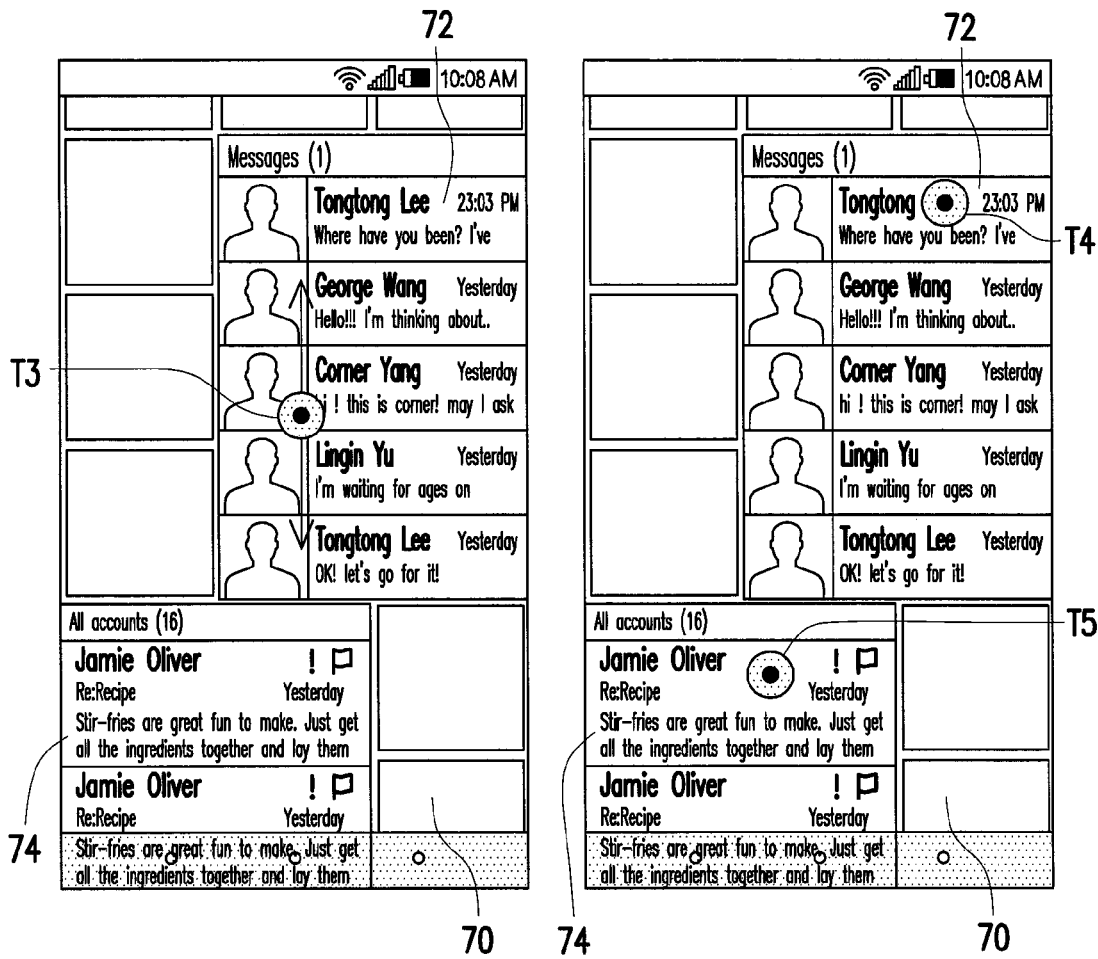
FIG. 7A and FIG. 7B are schematic diagrams illustrating a method for operating frame content according to an example of the present application.

FIG. 7A and FIG. 7B are schematic diagrams illustrating a method for operating frame content according to an example of the present application. Referring to FIG. 7A, a page 70 is displayed on the touch screen and includes content scrollable frames 72 and 74, in which the content scrollable frame 72 is entirely shown on the touch screen and the content scrollable frame 74 is partially shown on the touch screen. When the page 70 is static, a scrolling operation T3 performed on the entirely-shown content scrollable frame 72 may cause the content in the content scrollable frame 72 to be scrolled according to the scrolling operation T3. However, when the page 70 is not static (i.e. under moving), even though a scrolling operation T3 is performed on the entirely-shown content scrollable frame 72, the scrolling operation T3 functions only on the page 70 instead of the content scrollable frame 72. Similarly, referring to FIG. 7B, when the page 70 is static, a tap operation T4 performed on an item of the entirely-shown content scrollable frame 72 may cause the item being tapped to be launched and a tap operation T5 performed on an item of the partially-shown content scrollable frame 72 may also cause the item being tapped to be launched. In short, when a tap operation is performed on any item of a content scrollable frame (e.g. the frames 72 and 74), the item being tapped is launched, no matter the content scrollable frame is entirely shown or partially shown on the touch screen. However, when the page 70 is not static (i.e. under moving), both the tap operation T4 and the tap operation T5 may cause an interruption of the scrolling on the page 70 and therefore the page 70 is stopped.

It is noted that, in the aforesaid examples, all the frames in a list view are set as content scrollable frames. However, in another examples, those frames are further identified so as to determine whether to support frame content scrolling. To be specific, in one example, an application corresponding to each frames is identified whether to be a registered application or an unregistered application (e.g. third party application). If the application is identified as the unregistered application, the frame representing the application is set as the content unscrollable frame and when a scrolling operation is performed on this frame, the instructions of the scrolling operation are prohibited from being sent to the application. However, in another example, an application corresponding to each frames is inquired whether to support the scrolling function. If the application responses the support on the scrolling function, the frame representing the application is set as the content scrollable frame.

The present application further provides a recording medium, which records a computer program for executing various steps of the frame content scrolling method described above. The computer program is composed of a plurality of code snippets (for example, an organization chart establishment code snippet, a form approval code snippet, a settings code snippet, and a deployment code snippet). After these code snippets are loaded into an electronic apparatus and executed by the same, the steps of the frame content scrolling method described above can be accomplished.

As described above, the present application provides a method and an electronic apparatus for scrolling frame content and a recording medium using the same, in which whether a content scrollable frame is entirely shown on the touch screen is used as a basis to determine whether to scroll the content in the content scrollable frame. Besides, whether the page is static may be further incorporated in the basis to determine whether to scroll the content in the content scrollable frame. As a result, the scrolling operation of the user can be ideally identified so as to scroll the frame content or the page according to the user's will, and a convenient and intuitive way for operating the electronic apparatus can be achieved.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims and their equivalents.

What is claimed is:

1. A method for scrolling frame content, adapted to an electronic apparatus having a touch screen, the method comprising:

displaying a page comprising at least one content scrollable frame on the touch screen;

detecting a scrolling operation performed on a content scrollable frame of the at least one content scrollable frame on the touch screen;

determining, in response to the scrolling operation performed on the content scrollable frame being detected, whether the content scrollable frame is entirely shown or partially shown on the touch screen;

scrolling a content in the content scrollable frame according to the scrolling operation if the content scrollable frame is determined to be entirely shown on the touch screen; and scrolling the page and the content scrollable frame according to the scrolling operation if the content scrollable frame is determined to be partially shown on the touch screen.

2. The method for scrolling frame content according to claim 1, further comprising:

determining whether the page is static or not; and scrolling the content in the content scrollable frame according to the scrolling operation if the page is determined to be static and the content scrollable frame is determined to be entirely shown on the touch screen.

3. The method for scrolling frame content according to claim 2, further comprising:
   determining whether the content scrollable frame is entirely shown or partially shown on the touch screen if the page is determined to be static.

4. The method for scrolling frame content according to claim 2, further comprising:
   determining whether the page is static or not if the content scrollable frame is determined to be entirely shown on the touch screen.

5. The method for scrolling frame content according to claim 2, further comprising:
   scrolling the page and the content scrollable frame according to the scrolling operation if the page is determined to be not static.

6. An electronic apparatus for scrolling frame content, comprising:
   a touch screen;
   a storage unit, storing a plurality of modules; and
   one or more processing units, coupled to the touch screen and the storage unit, executing the modules stored in the storage unit to cause the electronic apparatus to:
   display a page comprising at least one content scrollable frame on the touch screen;
   detect a scrolling operation performed on a content scrollable frame of the at least one content scrollable frame;
   determine, in response to the scrolling operation performed on the content scrollable frame being detected, whether the content scrollable frame is entirely shown or partially shown on the touch screen;
   scroll a content in the content scrollable frame according to the scrolling operation if the content scrollable frame is determined to be entirely shown on the touch screen; and
   scroll the page and the content scrollable frame according to the scrolling operation if the content scrollable frame is determined to be partially shown on the touch screen.

7. The electronic apparatus for scrolling frame content according to claim 6, wherein the one or more processing units executing the modules stored in the storage unit to cause the electronic apparatus to:
   scroll the content in the content scrollable frame without scrolling the page and the content scrollable frame according to the scrolling operation.

8. The electronic apparatus for scrolling frame content according to claim 6, wherein the one or more processing units executing the modules stored in the storage unit to cause the electronic apparatus to:
   scroll the page and the content scrollable frame according to the scrolling operation without scrolling the content in the content scrollable frame.

9. The electronic apparatus for scrolling frame content according to claim 6, wherein the one or more processing units executing the modules stored in the storage unit to cause the electronic apparatus to:
   determine whether the page is static or not, and scroll the content in the content scrollable frame according to the scrolling operation if the page is determined as static and the content scrollable frame is determined to be entirely shown on the touch screen.

10. The electronic apparatus for scrolling frame content according to claim 9, wherein the one or more processing units executing the modules stored in the storage unit to cause the electronic apparatus to:
    determine whether the page is static or not after the scrolling operation performed on the content scrollable frame on the touch screen is detected.

11. The electronic apparatus for scrolling frame content according to claim 9, wherein the one or more processing units executing the modules stored in the storage unit to cause the electronic apparatus to:
    scroll the content in the content scrollable frame without scrolling the page and the content scrollable frame according to the scrolling operation.

12. The electronic apparatus for scrolling frame content according to claim 9, wherein the one or more processing units executing the modules stored in the storage unit to cause the electronic apparatus to:
    determine whether the content scrollable frame is entirely shown or partially shown on the touch screen if the page is determined to be static.

13. The electronic apparatus for scrolling frame content according to claim 9, wherein the one or more processing units executing the modules stored in the storage unit to cause the electronic apparatus to:
    determine whether the page is static or not if the content scrollable frame is determined to be entirely shown on the touch screen.

14. The electronic apparatus for scrolling frame content according to claim 9, wherein the one or more processing units executing the modules stored in the storage unit to cause the electronic apparatus to:
    scroll the page and the content scrollable frame according to the scrolling operation if the page is determined to be not static.

15. The electronic apparatus for scrolling frame content according to claim 14, wherein the one or more processing units executing the modules stored in the storage unit to cause the electronic apparatus to:
    scroll the page and the content scrollable frame according to the scrolling operation without scrolling the content in the content scrollable frame.

16. A non-transitory recording medium, adapted to store a computer program, wherein the computer program is loaded to an electronic apparatus to execute following steps:
    displaying a page comprising at least one content scrollable frame on a touch screen of the electronic apparatus;
    detecting a scrolling operation performed on a content scrollable frame of the at least one content scrollable frame on the touch screen;
    determining, in response to the scrolling operation performed on the content scrollable frame being detected, whether the content scrollable frame is entirely shown or partially shown on the touch screen;
    scrolling a content in the content scrollable frame according to the scrolling operation if the content scrollable frame is determined to be entirely shown on the touch screen; and
    scrolling the page and the content scrollable frame according to the scrolling operation if the content scrollable frame is determined to be partially shown on the touch screen.

* * * * *